United States Patent [19]

Kemplin

[11] Patent Number: 5,036,316
[45] Date of Patent: Jul. 30, 1991

[54] METHOD AND APPARATUS FOR HIGH SPEED LINEAR SHADING IN A RASTER GRAPHICS SYSTEM

[75] Inventor: Steven C. Kemplin, Rio Rancho, N. Mex.

[73] Assignee: Honeywell Inc., Minneapolis, Minn.

[21] Appl. No.: 332,602

[22] Filed: Apr. 3, 1989

[51] Int. Cl.$^5$ .............................................. G09G 5/36
[52] U.S. Cl. .................................. 340/728; 340/747; 364/521
[58] Field of Search ............... 340/747, 744, 723, 729, 340/728; 364/521, 522

[56] References Cited

U.S. PATENT DOCUMENTS

| | | | |
|---|---|---|---|
| 4,658,247 | 4/1987 | Gharachorloo | 340/747 |
| 4,901,251 | 2/1990 | Sfarti | 340/723 |
| 4,944,034 | 7/1990 | Ohsawa | 340/747 |

FOREIGN PATENT DOCUMENTS 6079475 5/1985 Japan .

OTHER PUBLICATIONS

IBM Technical Disclosure Bulletin, vol. 28 No. 7, Dec. 1985 pp. 3080 and 3081.

*Primary Examiner*—Jeffery A. Brier
*Attorney, Agent, or Firm*—Haugen and Nikolai

[57] ABSTRACT

A method and apparatus for linear shading of a polygon rendered in a raster graphics display is disclosed. Apparatus is included for selecting a key vertex which is located opposite to an edge of the polygon having a selected orientation. Apparatus is further included for dividing the polygon into a group of triangles so as to create a base leg for each of the triangles in the selected orientation. Apparatus is further included for calculating the horizontal endpoints and their associated luminance values for each scan line between each triangle's base and the bases opposite vertex so as to describe a plurality of scan lines further comprising a plurality of pixels within each triangle. Apparatus for interpolating the luminance of each of the scan line pixels so as to shade each of the triangles completes the linear shading. In one embodiment of the invention, the pixel luminance values for several pixels can be simultaneously calculated resulting in greatly improved throughput as compared to known systems.

12 Claims, 5 Drawing Sheets

METHOD AND APPARATUS FOR HIGH SPEED LINEAR SHADING IN A RASTER GRAPHICS SYSTEM

FIELD OF THE INVENTION

This invention pertains to linear shading in a raster graphics display and, more particularly to a method and apparatus for high speed linear shading of polygons used in such displays.

BACKGROUND OF THE INVENTION

In a raster graphics system, an image is created by an array of points, known as pixels, illuminated to different intensities. In a monochrome system, this intensity is known as luminance. In a color graphics system, there are separate luminances for red, green, and blue. Thus, a color graphics system can be considered to be three monochrome graphics systems operating in parallel.

Figure 1:
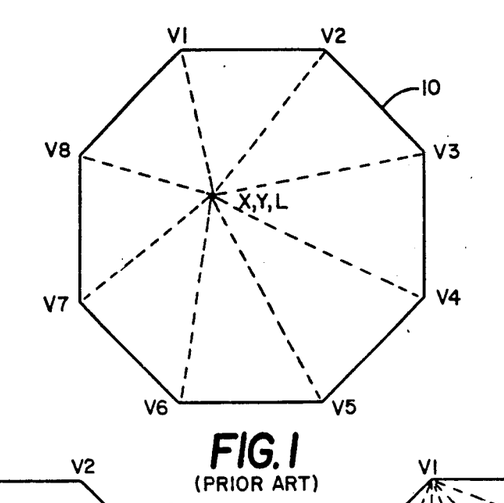
FIG. 1 illustrates a classical method of doing linear shading in a raster graphics system.

Typically, objects in such a system are modeled as a series of polygons, where each vertex of the polygon may be at a different luminance. The points on the interior of the polygon will have luminance values interpolated from the luminance values at the vertices. As is schematically illustrated in FIG. 1, in the past, the luminance for each pixel has been calculated individually by computing the distance from each pixel to each of the vertices of the polygon and doing a linear interpolation. This type of linear shading is commonly known as "Gouraud" shading. Because of the extreme computational load, this process is very slow. The invention offers a method to rapidly draw linearly shaded polygons in a raster graphics system, thus, alleviating the aforementioned deficiencies of the prior art.

SUMMARY OF THE INVENTION

A method and apparatus for linear shading of a polygon rendered in a raster graphics display is disclosed. Means is included for selecting a key vertex which is located opposite to an edge of the polygon having a selected orientation. Means is further included for dividing the polygon into a group of triangles so as to create a base leg for each of the triangles in the selected orientation. Means is further included for calculating the horizontal endpoints and their associated luminance values for each scan line between each triangle's base and the base's opposite vertex so as to describe a plurality of scan lines further comprising a plurality of pixels within each triangle. Means for interpolating the luminance of each of the scan line pixels so as to shade each of the triangles completes the linear shading.

In one embodiment of the invention, the luminance value for several pixels can be calculated simultaneously. The method of the invention also lends itself to an efficient implementation in a custom integrated circuit chip set.

DETAILED DESCRIPTION OF THE PREFERRED EMBODIMENT

In order to enhance the understanding of the invention, the conceptual basis involved will be described first followed by a description of a particular implementation of the invention, along with its unique features. The particular implementation presented is intended to serve as an illustrative example and those skilled in the art will understand that the invention is not limited by the specific features of the described embodiment but may be implemented in various other embodiments not shown here.

Figure 2:
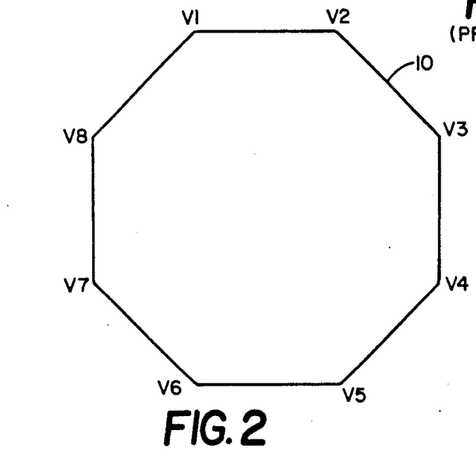
FIG. 2 is a drawing of a polygon which is used as an example herein to describe the method.

Attention is drawn to the polygon 10 as shown in FIG. 2. Although the method of the invention will be understood to work with any polygon, an octagon will serve to explain the method of the invention because it is easy to draw.

Figure 3:
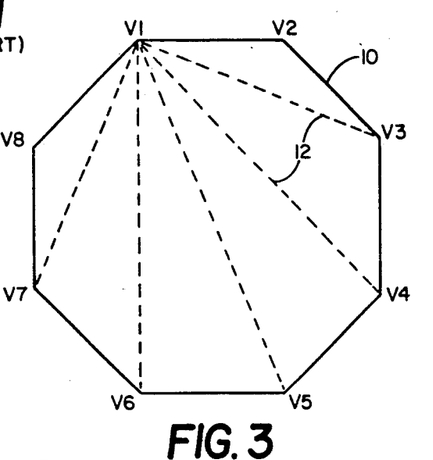
FIG. 3 shows the polygon of FIG. 2 partially decomposed into triangles as required by the method of the invention.

The polygon 10 is first broken down into triangles 12 as shown in FIG. 3. This process must be done in such a way that one leg of each resulting triangle is in a particular selected orientation. This leg shall be known as the base. The selected orientation should be chosen so that the object to be drawn has a large number of lines to be drawn in the selected orientation, since this method is optimized for rapid drawing in the selected orientation. For example, most natural objects contain many horizontal lines, so it is typically advantageous to choose the selected orientation to be horizontal. If this invention is embodied in a system using a single-buffered image memory, the memory design may constrain the choice of orientation. For ease in describing the invention herein, the selected orientation shall be designated as horizontal, although the invention is not limited to this orientation.

Now referring to FIG. 3, next a "key" vertex V1 which is opposite to a horizontal edge on the polygon is selected. Although vertex V1 was selected in this case, points V2, V5, or V6 could have been used instead. The key vertex is then connected with all vertices not immediately adjacent to it as shown by dotted lines 12. Notice that polygon 10 has now been broken into triangles. Some triangles, such as V1-V2-V3 and V1-V5-V6 already have one horizontal leg and, therefore, need no further work at this point. Other triangles, such as V1-V7-V8 do not have a horizontal leg, and thus must be broken up further as shown in FIG. 4 in order to create a system of triangles, each of which has a base with the selected orientation.

Figure 4:
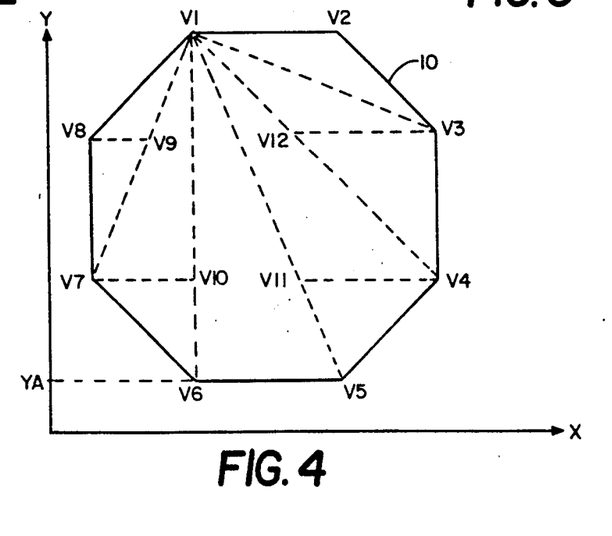
FIG. 4 shows the polygon of FIG. 2 completely decomposed into specialized triangles as required as an intermediate step by the method of the invention.

Still referring to FIG. 4, those skilled in the art will recognize that each vertex has X and Y coordinates in a raster graphics system. These coordinates are integers which are assigned to each pixel location on the display screen. Two points are on the same horizontal line if they have the same Y coordinate. For example, points V5 and V6 of FIG. 4 have the same Y coordinate YA. To find the coordinates of point V9 for example, note that the Y coordinate of point V9 is the same as the Y coordinate of point V8. Thus, all that is necessary to locate the base for triangle V7-V8-V9 is to find the point on line V1-V7 that has the same Y coordinate as point V8. An N-sided polygon can be decomposed into no more than N+2 triangles of the type useful to implement the method of the invention.

Figure 5:
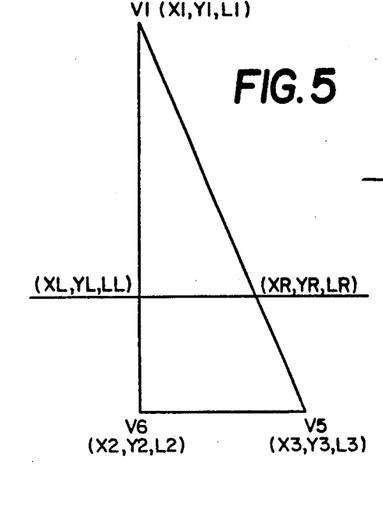
FIG. 5 is an illustration of a further intermediate process of the invention of breaking a triangle down into scan lines.

Having completed the division of the sample polygon into the requisite triangles, attention is now drawn to FIG. 5 showing a single triangle. Those skilled in the art will understand that the method developed below with respect to FIG. 5 can be repeated on all other triangles in the polygon. FIG. 5 shows triangle V1-V5-V6, isolated and enlarged for clarity. Notice that each point has X and Y coordinates and an associated luminance (L) value. In a raster graphics system, all of these values will be integers. Note also that $Y2=Y3$ and $YL=YR=Y$ since the lines that these points lie on are horizontal.

Let $N=Y2-Y1$ and define the following quantities:

$$DXL=(X2-X1)/N \qquad \text{Equation 1}$$

$$DXR=(X3-X1)/N \qquad \text{Equation 2}$$

$$DLL=(L2-L1)/N \qquad \text{Equation 3}$$

$$DLR=(L3-L1)/N \qquad \text{Equation 4}$$

Two points deserve mention here. First, if the triangle being operated on is inverted, as for example, V1-V2-V3 of FIG. 4, N will be a negative number. Second, DXL, DXR, DLL, and DLR may be positive or negative and will have both integer and fractional parts.

Given the values X1, Y1, L1, N, DXL, DLL, DXR and DLR, the values for XL, LL, XR, and LR for any integer Y (i.e. any line) which lies between Y1 and Y2 may be calculated by the following procedure which is shown below in pseudocode:

Initialize:

$$N=Y2-Y1 \qquad \text{Step 0}$$

$$XL=XR=X1 \qquad \text{Step 1}$$

$$LL=LR=L1 \qquad \text{Step 2}$$

$$Y=Y1 \qquad \text{Step 3}$$

For I=1 to ABS (N) do $$XL=XL+DXL \qquad \text{Step 4}$$

$$XR=XR+DXR \qquad \text{Step 5}$$

$$LL=LL+DLL \qquad \text{Step 6}$$

$$LR=LR+DLR \qquad \text{Step 7}$$

$$Y=Y+1 \qquad \text{Step 8}$$

End;

If N happens to be negative as it will be for triangle V1-V2-V3 for example, step 8 would decrement Y rather than incrementing it.

It should be noted that although the algorithm is presented as software steps, it doesn't have to be implemented as such. Also, it should be noted that several steps can be done in parallel. For example, steps 4 through 8 can all be done simultaneously.

Figure 6:
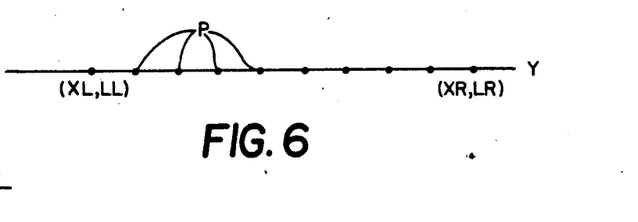
FIG. 6 is an illustration of pixels along a scan line.

FIG. 6 represents a single horizontal line within a triangle. Remember that in a raster graphics display, all images are really composed of discrete pixels at varying luminance levels. This is what the dots P along the line in FIG. 6 represent.

All that is necessary now is to calculate the luminance of every pixel along the line between XL and XR.

Define:

$$DL=(LR-LL)/(XR-XL) \qquad \text{Step 9}$$

Note that again DL will contain integer and fractional parts, and may be positive or negative. Note also that DL is not the same as DLL or DLR.

To draw the line, perform this procedure:

$$L=LL \qquad \text{Step 10}$$

For X=XL to XR do $$\text{SETPIXEL (X, Y, L)} \qquad \text{Step 11}$$

$$L=L+DL \qquad \text{Step 12}$$

$$X=X+1 \qquad \text{Step 13}$$

Figure 13:
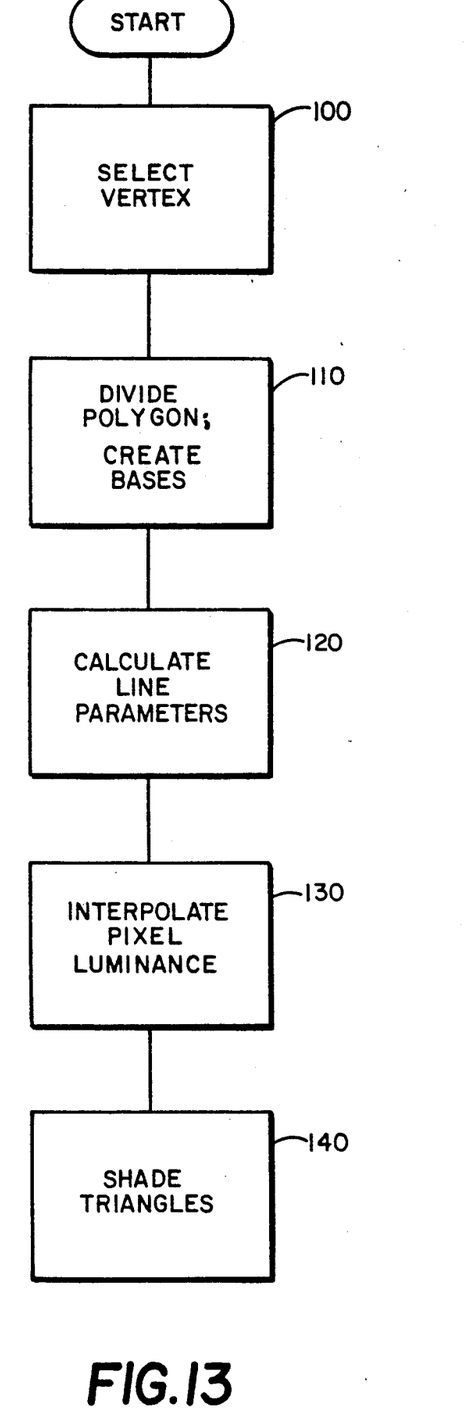
FIG. 13 is a flow chart generally showing the processing flow of the method of the invention.

End;

Having described the basis of the method of the invention by the above detailed example, attention is now directed to FIG. 13 which is a flow chart generally showing the processing steps employed by the method of the invention. As shown in FIG. 13, the method starts at step 100 by selecting a key vertex which is located opposite to an edge of the polygon having a selected orientation. The process then proceeds to step 110 wherein the polygon is divided into a group of triangles so as to create a base for each triangle in the selected orientation. Next in step 120, the method calculates the line parameters including the horizontal endpoints and luminance values for each line between each triangle's base and the base's opposite vertex so as to describe a plurality of scan lines further comprising a plurality of pixels within each triangle. Finally, step 130 interpolates the luminance of each scan line pixel so as to shade each of the triangles. As a result of shading all of the triangles, the entire polygon is, of course, shaded.

Having described the method of the invention in detail, a particular embodiment of the apparatus of the invention will now be described. This description is intended to be by way of illustration and not by way of limitation of the invention.

Figures 7, 8:
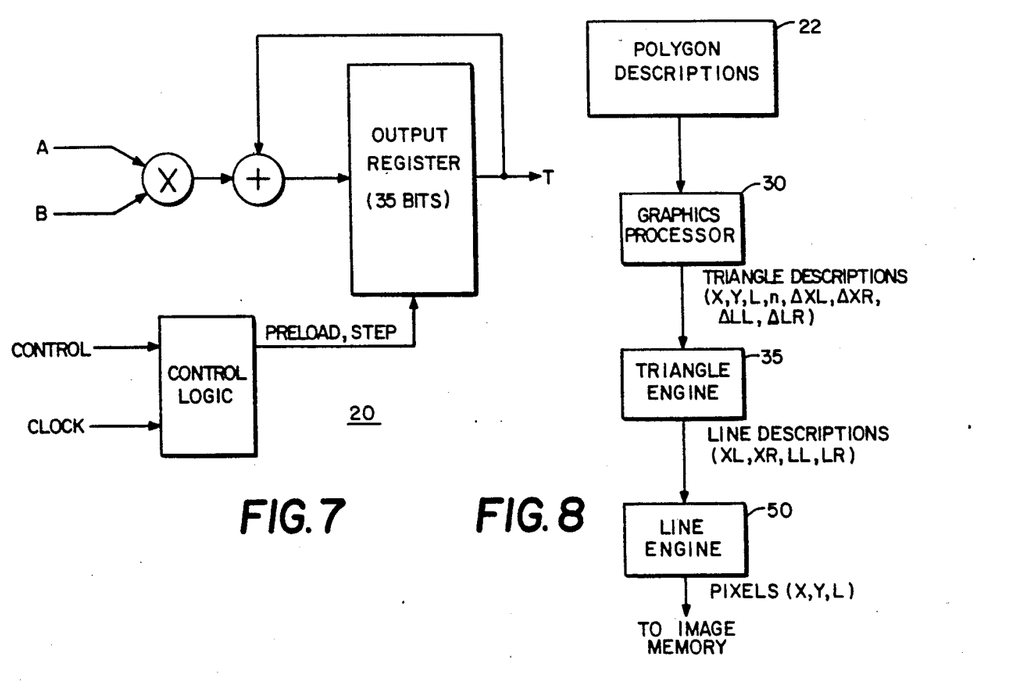
FIG. 7 is a block diagram of a multiplier-accumulator chip (MAC) which may be employed by the invention.
FIG. 8 is a block diagram of a graphics system including one embodiment of the invention.

One of the factors leading to the particular design described herein is the commercial availability of multiplier-accumulator (MAC) semiconductor integrated chips. These chips allow easy implementation of the method of the invention into apparatus even though the full capability of the chip is not exploited. A block diagram of a MAC 20 is shown in FIG. 7. MAC chips implement the function $T=T+(A*B)$ where "*" indicates integer multiplication.

To clarify further, suppose one wishes to calculate XL (see step 4 above). First, preload the output register with X1 (step 1) and set A=DSL, B=1. Notice that this means that the multiply portion of the MAC (DXL*1=DXL) is effectively not used. Now, for every new value of Y, force the MAC to step, generating XL=X1, XL=X1+DXL, XL=X1+2*DXL, etc., thereby generating the desired values of XL. By a similar method, we can generate XR, LL, and LR also. One can also use 4 MACs and generate all of the values (XL, XR<LL<LR) in parallel in a single clock cycle for each value of Y.

Having laid the groundwork above, the overall architecture for the machine can now be more clearly described. The architecture is shown in FIG. 8 and comprises a means for providing polygon descriptions 22, a graphics processor 30, a triangle engine 35 and a line engine 50. The graphics processor 30 takes polygon descriptions and decomposes them into triangles of the type mentioned earlier. It then calculates X1, Y1, L1, N, DXL, DXR, DLL and DLR and feeds these values to the triangle engine 35. The graphics processor may perform other functions as well. Notice that with a suitable buffer connecting the graphics processor to the triangle engine, the graphics processor needn,t wait for the triangle engine to finish (or even start) before it begins work on the next polygon.

The triangle engine 35 accepts the data from the graphics processor and produces a series of XL, XR, LL, and LR values which, when used by the line engine, will produce the image of a properly shaded triangle. It may advantageously consist of the four MACs mentioned earlier, an N counter, an up/down Y counter, and a hardware state machine to control the other elements. Counters can be used for N and Y because they are always either loaded, incremented by one, or decremented by one.

The line engine 50 takes each set of XL, XR, LL, and LR values and generates a series of pixel values which will, in conjunction with all other pixel values so generated, result in the display of the polygon as desired. The process of displaying the pixel values is well known.

By examining steps 11 through 13 as set out hereinabove, it can be seen that the luminance value for any point between (XL,Y) and (XR,Y) can be generated by an accumulator. A counter can be used to generate the X values.

By way of example, suppose that it is necessary to draw a polygon that completely fills the display field. Further, suppose that the image memory for the display field is 1024×1024 pixels and is composed of memories with a cycle time of 100 nanoseconds. To draw this polygon, luminance values must be stored in 1024×1024=1,048,576 locations. If each memory access takes 100 nanoseconds, the time required will be 1,048,576×0.0000001=0.1048 seconds or 104.8 milliseconds. This means that the image could be updated no more than 1/0.1048 or 9.5 times per second. A higher update rate will result if more than one pixel at a time is operated on. In order to explain how this is done, it is again best to refer to a concrete example. It should be noted, however, that this approach can be generalized to any size image memory or any number of pixels simultaneously. In practice, the only limiting factor will be the width of the bus connecting the line engine to the image memory.

Figure 9:
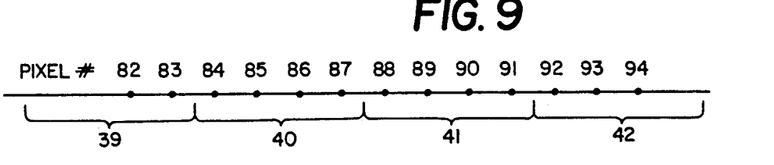
FIG. 9 is an illustration of pixel segments.

For the purposes of describing the invention, a "pixel segment" may be defined as a group of pixels to be operated on simultaneously. These pixels must be adjacent to each other an in a straight line horizontally. This is the reason for the earlier restriction of the method that the base or each triangle be horizontal. For the purposes of this discussion and not by way of limitation of the invention, assume that a pixel segment is four pixels wide. Those skilled in the art will recognize that a pixel segment can be any number of pixels wide and it is possible to orient such segments in a nonhorizontal fashion. Any horizontal line to be drawn can now be broken into a number of pixel segments 39–42, with some odd number of pixels comprising a partial segment 39, for example, on the ends of the line as shown in FIG. 9.

Figure 10:
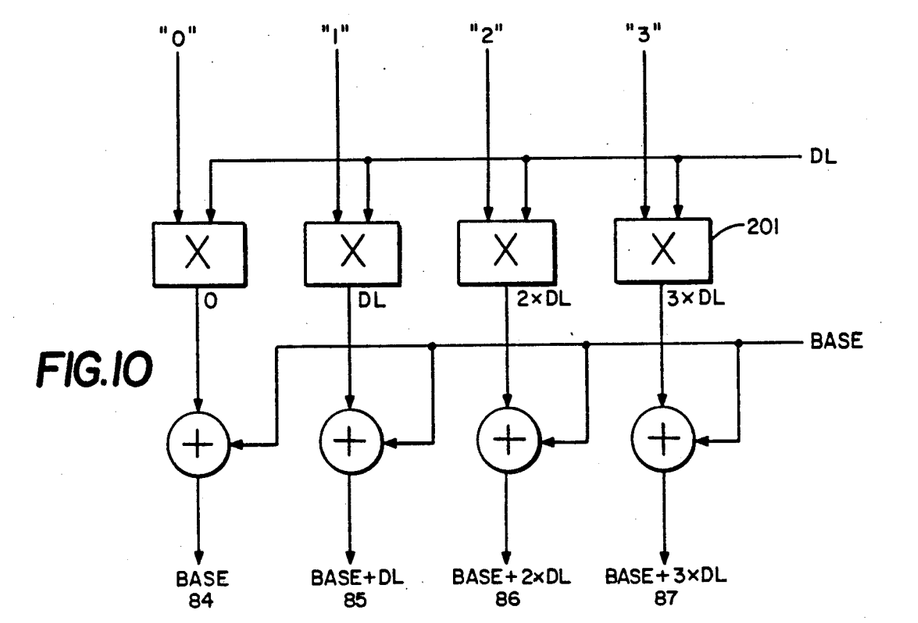
FIG. 10 is a partial block diagram of a line engine as employed by one of the invention.

Let the luminance value of the leftmost pixel, 84, in a segment be the "base" or "offset" value. Then the luminance value for the second pixel is base+DL. Similarly, the luminance value for the third pixel will be base+2*DL, and for the fourth pixel, base+3*DL. FIG. 10 shows how the luminance values for all four pixels 84–87 in a segment can be calculated simultaneously in a multiplier-adder array. Note the similarity of this array to the block diagram of a MAC 20 as shown in FIG. 7. Note further that the base value for the (K+1) pixel segment is equal to the base value of the Kth pixel segment plus 4*DL where K is any integer. Note also that since each base value always has zero added to it, the multiplier and adder shown in the left hand column of FIG. 10 are unnecessary and have been eliminated in the embodiment shown in FIG. 11.

Figure 11:
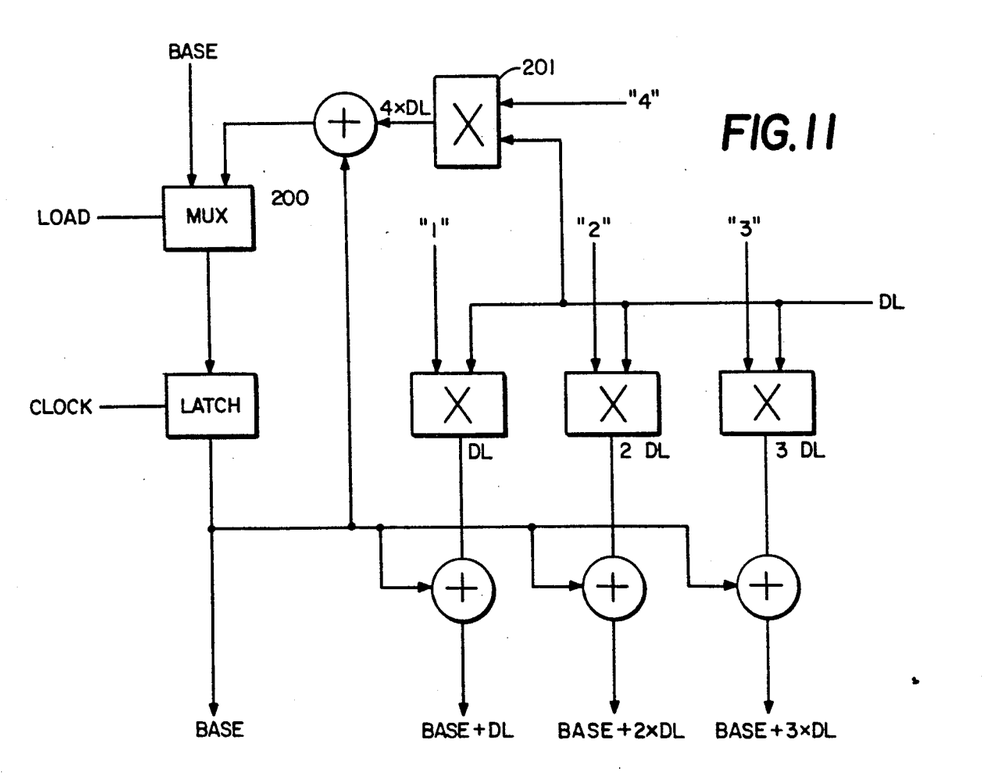
FIG. 11 is a partial block diagram of an improved line engine as employed by one embodiment of the invention.

Using the embodiment shown in FIG. 11, the initial base value and DL may be loaded while giving the multipliers 201 time to settle (since multipliers are typically the slowest part of this architecture). Thereafter new pixel segments are generated, each containing four pixels, in a single clock cycle. The minimum clock cycle is determined by the settling time of the adder-mux-latch loop. In practice the actual clock cycle will likely be slower because the storage of the created pixel values in the image memory takes more time than the generation of a new pixel segment. Also in practice, the pixel value outputs will advantageously be latched so that the new pixel value, (the next segment) can be generated while the last segment is being written to the image memory. A multiplexer 200 is preferably included so that the initial base value (the luminance value of the first pixel in the first segment) can be loaded.

The above approach works if all drawn lines begin and end on pixel segment boundaries. As mentioned earlier, odd pixels on the ends of lines add complexity.

Attention is now drawn to odd pixels, 92, 93, and 94, on the right hand end of a line as shown in FIG. 9. The pixel values are calculated just as if a full segment was going to be written, and the extra values are simply not written to the image memory. For example, using the case shown in FIG. 9, we would store the values generated for pixels 92, 93, and 94 in the image memory, but we would not write the value for pixel 95 (not shown) into the memory. The most advantageous way to do this is to inhibit the generation of write-enable pulses to the image memory when it is desirable not to store the generated value. By knowing XR (the pixel number of the right end of the line) and by knowing the segment currently being processed, the system can inhibit writing the warranted values.

The situation for odd pixels on the left end of the line is more complex. Not only does the system have to avoid writing extraneous values to the image memory, but it must modify the calculations of the pixel values because the LL value which the triangle engine yields is the luminance value of the leftmost value in the line, which may or may not fall on a pixel segment boundary. If the pixel values fall on a segment boundary, the pixel value calculations proceed exactly as described above. If they do not, as in FIG. 9, special actions need to be taken. Pixel 82 will be the base value (from the triangle engine), pixel 83 is base value plus DL, and pixel 84 is base value plus 2*DL. Referring again to FIGS. 10 and 11 reveals that the numbers labeled "1", "2", "3", and "4" represent the maximum values that the inputs to the multipliers can have, and this occurs only if the segment to be drawn starts at the leftmost pixel in the segment. Otherwise, these values will be as shown in Table 1.

TABLE 1

| Multiplier Values When Segment Does Not Start With Leftmost Pixel | | | | |
|---|---|---|---|---|
| Starting Pixel # (in segment) | "1" | "2" | "3" | "4" |
| 1 | 1 | 2 | 3 | 4 |
| 2 | 0 | 1 | 2 | 3 |
| 3 | 0 | 0 | 1 | 2 |
| 4 | 0 | 0 | 0 | 1 |

This table can be extended to allow operation on any number of pixels simultaneously. The table may be advantageously stored in any suitable known digital memory storage device such as a RAM, ROM or equivalent device.

Figure 12:
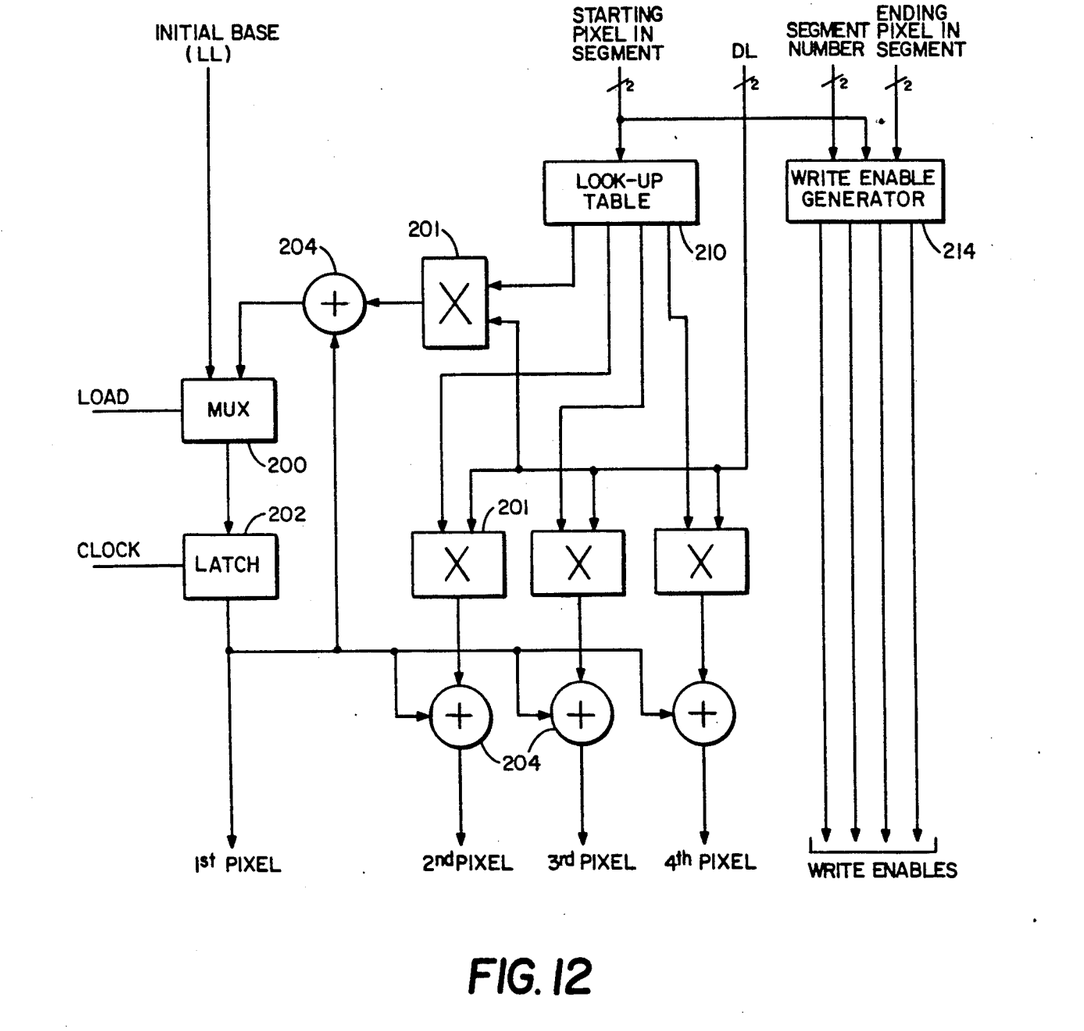
FIG. 12 is a complete block diagram of a line engine.

With the information derived above, it is now possible to create a line engine which will handle both the normal case and odd pixels at both the left and right ends of a line to be drawn. This modified line engine is shown in FIG. 12. The line engine of FIG. 12 includes a multiplexer 200, latch 202, adders 204, multipliers 201, lookup table 210 and write enable generator 214. The operation of the line engine shown in FIG. 12 is as described above with respect to FIG. 11 with the added capabilities of the generation of write-enable pulses to the image memory for partial pixel segments by means of write-enable generator 214, and the storage and access of multiplier values in the lookup table 210 in accordance with Table 1.

It is anticipated that all or part of the invention may be implemented in a custom logic device embedded in semi-conductor material. If this is done, it may be desireable to remove unused capability from the device in order to save silicon. For example, when working with four pixels per segment the largest multiplier value from Table 1 is 4. Most of the capability of a 16×16 or 24×24 multiplier would be wasted. A 3×16 or a 3×24 multiplier would be a better choice, and could be implemented as a series of shifters, multiplexers, and adders.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for linear shading of a polygon rendered in a raster graphics display comprising the steps of:

(a) selecting a key vertex which is located opposite to an edge of the polygon having a selected orientation;
    (b) dividing the polygon into a group of triangles so as to create a base leg for each of the triangles in the selected orientation;
    (c) calculating the horizontal endpoints and their associated luminance values for each scan line between each triangle's base and the base's opposite vertex so as to describe a plurality of scan lines further comprising a plurality of pixels within each triangle; and
    (d) interpolating the luminance of each of the scan line pixels so as to shade each of the triangles.

2. The method of claim 1 wherein the scan lines comprise pixel segments including a predetermined number of pixels and the luminance value for each pixel on each, such scan line is a linear factor of the preceding pixel for each scan line.

3. The method of claim 2 wherein a portion of the pixels within a pixel segment on the right hand side of the scan lines are outside of the boundaries of the triangle wherein the left-hand side of the segment is included and wherein the method operates to inhibit writing of the outside right hand pixels.

4. The method of claim 2 or 3 wherein the luminance values of a portion of the pixels in any scan line are multiplied by factors derived from a lookup table.

5. The method of claim 2 wherein partial segments on the left hand side of any scan line are outside of the boundaries of the triangle wherein the rest of the pixel segment is included within the boundaries and wherein each pixel not so included is multiplied by a "0" luminance factor while the included pixels are multiplied by integers starting with 1 and increasing by adding 1 until the last included right most pixel in the segment is processed.

6. An apparatus for generating linear shading of a polygon rendered in a raster graphics display comprising:

(a) means for storing at least one polygon description;
    (b) graphics processor means for dividing the polygon descriptions into a group of triangles by selecting a key vertex of the polygon which is located opposite to an edge of the polygon having a selected orientation, dividing the polygon into a group of triangles so as to create a base leg for each of the triangles in the selected orientation;
    (c) means connected to the graphics processor means for calculating the horizontal endpoints and their associated luminance values for each line between each triangle's base legs and the base leg's opposite vertex so as to describe a plurality of scan lines further comprising a plurality of pixels within each triangle; and
    (d) means for interpolating the luminance of each of the scan line pixels so as to produce a shaded polygon.

7. The apparatus of claim 6 wherein the scan lines comprise pixel segments including a predetermined number of pixels and the luminance value for each pixel on each such scan line is an integer multiple of the preceeding pixel for each scan line.

8. The apparatus of claim 7 wherein a portion of the pixels within a pixel segment on the right hand side of the scan lines are outside of the boundaries of the triangle wherein the left-hand side of the segment is included and wherein the method operates to inhibit writing of the outside right hand pixels.

9. The apparatus of claim 7 or 8 wherein the luminance values of a portion of the pixels in any scan line are multiplied by factors derived from a loopup table.

10. The apparatus of claim 6 wherein partial segments on the left hand side of any scan line are outside of the boundaries of the triangle wherein the rest of the pixel segment is included within the boundaries and wherein each pixel not so included is multiplied by a "0" luminance factor while the included pixels are multiplied by integers starting with 1 and increasing by adding 1 until the last included right most pixel in the segment is processed.

11. The apparatus of claims 6, 7, 8, 9 or 10 wherein the interpolating means interpolates the luminance of at least two pixels in parallel.

12. The method of claims 1, 2, 3, 4 or 5 wherein the luminance of each of the scan line pixels is interpolated simultaneously.

* * * * *